(12) United States Patent
Bowman et al.

(10) Patent No.: US 6,460,163 B1
(45) Date of Patent: Oct. 1, 2002

(54) SOFTWARE AND METHOD FOR DIGITAL CONTENT VENDING AND TRANSPORT

(75) Inventors: Mark T. Bowman, Boca Raton; Leslie P. Hauck, Parkland; Christopher J. Monahan; Mary L. Monahan, both of Boca Raton; Victor S. Moore, Boynton Beach; Keith Morea, Boca Raton, all of FL (US); Emily J. Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,186

(22) Filed: Apr. 5, 2000

(51) Int. Cl.[7] .............................................. G06F 15/16
(52) U.S. Cl. ...................................... 714/819; 709/203
(58) Field of Search ........................... 714/819; 709/203

(56) References Cited

U.S. PATENT DOCUMENTS

| | | | | |
|---|---|---|---|---|
| 5,191,585 A | * | 3/1993 | Velazquez | 371/53 |
| 5,524,135 A | * | 6/1996 | Mizlkovsky et al. | 379/58 |
| 5,940,117 A | * | 8/1999 | Hassan et al. | 348/13 |
| 6,049,892 A | * | 4/2000 | Casagrande et al. | 714/18 |
| 6,085,249 A | * | 7/2000 | Wang et al. | 709/229 |

* cited by examiner

Primary Examiner—David Y. Eng
(74) Attorney, Agent, or Firm—Fleit, Kain, Gibbons, Gutman & Bongini P.L.

(57) ABSTRACT

In an E-commerce method for selling digital content over the Internet an FTP-like protocol is provided to carry out the delivery (download) of a purchased digital content item from a server computer to a client computer operated by the purchaser. The FTP-like communication protocol provides for error recovery during the download that does not require restarting the download from the beginning. After the download is completed the integrity of the downloaded file is checked. And the result of the check is communicated to the server which records that the digital content item has been successfully delivered to the purchaser.

18 Claims, 5 Drawing Sheets

SOFTWARE AND METHOD FOR DIGITAL CONTENT VENDING AND TRANSPORT

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

This invention pertains to selling of digital content over a computer network. More particularly the invention pertains to a system which ensures more reliable delivery of digital content via a computer network.

2. Background of the Invention

In the past few years there has been an immense increase in the volume of sales transactions conducted over the Internet. A large portion of the sales, are of physical tangible goods, that must be shipped via conventional means after an order is accepted via the Internet.

Another class of goods which may be offered for sale over the Internet is digital content. Digital content comprises computer files that have some monetary value. Examples of digital content include computer programs (e.g., accounting software, database software, data files, and multimedia material (e.g., digital audio files, digital video files)). In the case of digital content there is the possibility to complete the entire transaction, i.e., accept payment from a customer, and deliver the digital content to the customer, within the confines of the computer network (e.g., Internet).

The file transfer protocol (FTP) provides a flexible and reliable method to transfer files over the Internet. Usual implementations of this protocol provide a means for limiting access to FTP servers based username/password credentials, and some "anonymous FTP" enabled implementations of the protocol allow anyone unfettered access to the FTP server. The latter only require an email address, which no steps are taken to verify, to be entered as the password. Such email addresses are merely to be used for informational purposes by the system administrator. FTP systems commonly provide a method for recovery from a data transmission fault that does not entail retransmitting the entire file. This is especially useful in the case of large files. The FTP systems described, do not function to limit access to digital content to purchasers who have payed for them.

The Open Market Corporation provides a Hypertext Transfer Protocol (HTTP) based system which is useful for limiting access to certain files to paying customers. The system works as follows. A customer clicks on a product "Buy Button" in a World Wide Web (WWW), Hypertext Markup Language (HTML) document. The "Buy Button" points to cash register Common Gateway Interface (CGI) program, which presents a HTML form to the user for the purpose of accepting payment information. The customer then enters payment information, e.g. credit card information, and submits the form to by clicking on the submit button. The targeted cash register then verifies the payment information. If the payment information is accepted, the cash register program generates a special Uniform Resource Locator (URL) with appended data called a digital receipt which points to a digital receipt verification CGI program. The cash register then formats the digital receipt into a WWW page, and sends the WWW page to the user. When the user clicks on the link referencing the digital receipt URL the digital receipt is sent to the verification program which checks the digital receipt, and if it is found valid, generates a web page comprising a link to the purchased digital content. The user may then download or view the purchased digital content by clicking on the link to it. The digital receipt data may include an expiration date, or a limit on the number of downloads.

The Open Market system employs the HTTP protocol for communication and consequently suffers from certain limitations inherent to that protocol which make it less than ideally suited to the purpose of transferring purchased digital content. The HTTP protocol provides a communication model comprising a request from the client to the server for a resource indicated in a URL and a response transmitting the resource. There is no provision for a response to the response. The purchase of digital content being a business transaction can benefit from further communication to notify the seller that the buyer is satisfied with the purchased item.

Another shortcoming of the Open Market system is that it does not provide a means for verifying the content of the received digital content other than that provided in the lower levels of the communication protocol stack e.g. (TCP error correction). The user may not become aware of data errors until the file is accessed, at which time, the web browser loaded with the WWW page containing the digital receipt will have been closed and/or the digital receipt will have expired or the limit on downloads met.

Another shortcoming of the Open Market system resulting from its reliance on HTTP is that it does not provide a method for recovery for gross communication errors e.g. network errors which temporarily sever the client server communication link. In the case the download of the digital content is interrupted for some reason, e.g. due to a communication error, the digital content download will have to be restarted from the beginning. This can be particularly troublesome in the case of large multimedia files e.g. video files, which involve long downloads that tie up the user's computer.

Accordingly what is needed is a system and method which overcomes the abovementioned shortcomings, and more particularly which provides access for buyers to purchased digital content, that provides for verification of the integrity of the digital content, and communication between the client and the server as to the outcome of the verification.

What is further needed is a method for transmitting a digital content item between a client and a server that includes error recovery and avoids the necessity of retransmitting an entire file in the event of a communication error.

SUMMARY OF THE INVENTION

A method for transporting a digital content item between an order fulfillment server and a client computer, the method comprising steps of accepting a digital receipt from a user, presenting a choice of digital content for which the digital receipt is valid, accepting a request for a digital content item from the user, computing a first checksum of the digital content item at the order fulfillment server, transmitting the digital content item from the order fulfillment server to the client computer using a protocol capable or recovering from communication errors without the need to retransmit the entire digital content item, computing a second checksum of the digital content item at the client computer, and comparing the first checksum to the second checksum.

According to another aspect of the invention a system and computer readable medium is disclosed for carrying out the above method.

BRIEF DESCRIPTION OF THE FIGURES.

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Exemplary Client-Server Network According to an Embodiment of the Invention

Figure 1:
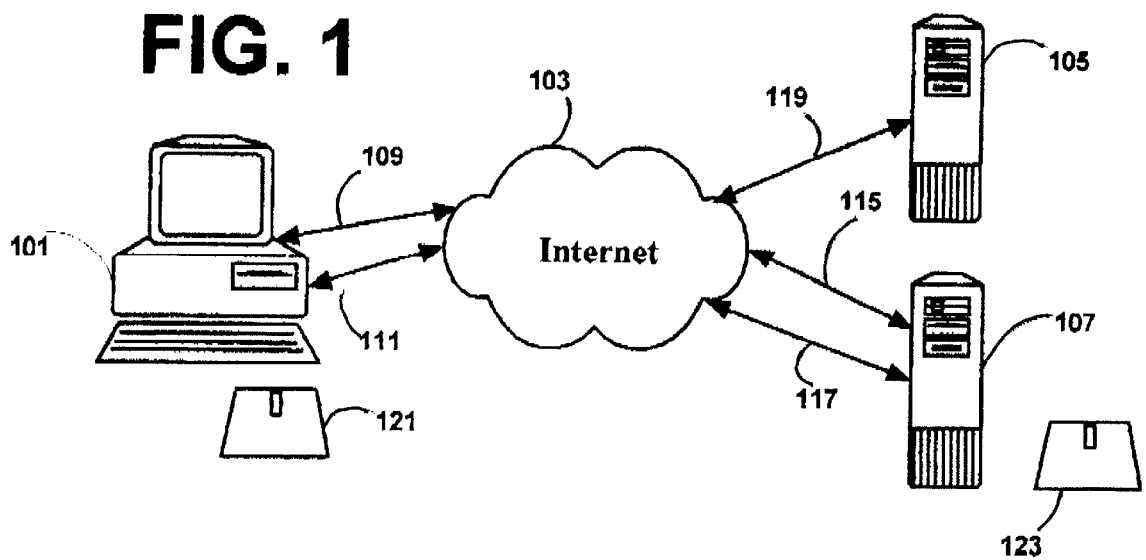
FIG. 1 is a schematic of a computer systems used in practicing an embodiment of the invention.

Referring to FIG. 1 a schematic of the computer system used in connection with the present invention is depicted. A client computer 101 is provided with a first connection 109 and a second connection 111 to the Internet 103. The first connection and the second connection can use the same physical transmission medium and may distinguished by being assigned different port numbers at the transport control layer. A cash register server 105 is connected to the Internet through a connection 119. An order fulfillment server 107, is connected to the Internet through a first connection 115, and second connection 117. The order fulfillment server may also serve as an online store server, to which a user may navigate to for the purpose of placing orders for a digital content. Alternatively, a separate store front host server (not shown) connected to the Internet may be provided. During the order fulfillment phase of the process of the instant invention, it is useful to have two connections between the client and the order fulfillment server. One connection can be used for sending commands (e.g. requests for retransmission) between the client and the order fulfillment server, while the other connection is reserved for sending the digital content item from the order fulfill server to the client. This allows the server to be listening on one connection for reports of a transmission error without interrupting the transmission process. Messages acknowledging receipt of the digital content item could also be sent through the connection for sending commands. In the schematic one connection, between the client and the order fulfillment server, which is identified by unique port numbers at the server and client, could comprise connections 109 and 115, while the other comprises connections 111, and 117. The intermediate portions of the two connections are within the Internet.

The client computer 101, cash register server 105, and order fulfillment server 107 may for example be IBM compatible PC computers comprising a microprocessor, basic input output, read-only memory (BIOS ROM), random access memory (ROM), a hard drive, and removable media drive (e.g. CD ROM, 1.44 MB diskette drive).

Software for the configuring client computer 101 to carry out client side precesses of the invention, e.g. receiving a digital content item, computing a checksum, communicating with the order fulfillment server, as will be discussed below, can be loaded onto the client computer 101 from one or more removable diskettes 121.

Software for configuring the order fulfillment computer 107, to carry out server side processes,e.g. receiving a digital receipt, parsing the digital receipt, maintaining a database of information related to purchase computing a checksum, sending a digital content item, and receiving messages from the client computer, can be loaded onto the order fulfillment server from one or more diskettes 123.

Software for configuring the cash register server to perform various function discussed below can also be loaded onto the cash register server from a diskette.

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Exemplary Software Stack According to an Embodiment of the Invention

Figure 2:
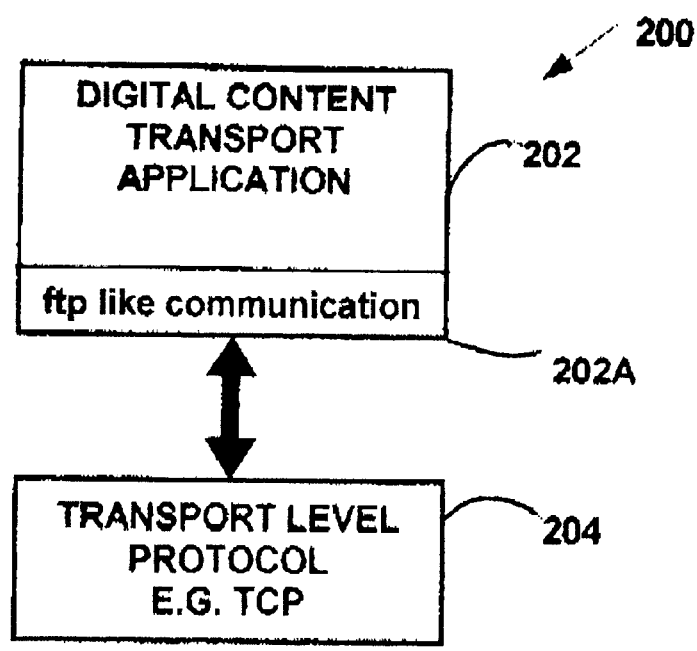
FIG. 2 is a representation of a software stack according to an embodiment of the present invention.

Referring to FIG. 2 a software stack 200 used in connection with an embodiment of the invention is shown. The software stack comprises the lower level 204 a transport protocol for example TCP/IP. At an upper level, the software stack comprises a digital content transport application 200, which comprises FTP-like communication protocol. The communication protocol is FTP-like in the sense that it comprises a mechanism for recovering from a communication error without having to retransmit the entire item being transmitted (an example of such a mechanism will be described below) and/or in the sense that two connections are established between the client and the order fulfillment server-one for transmitting the digital content item and one for managing the transmission and sending confirmation related information and/or messages between the client and the order fulfillment server.

Figure 3:
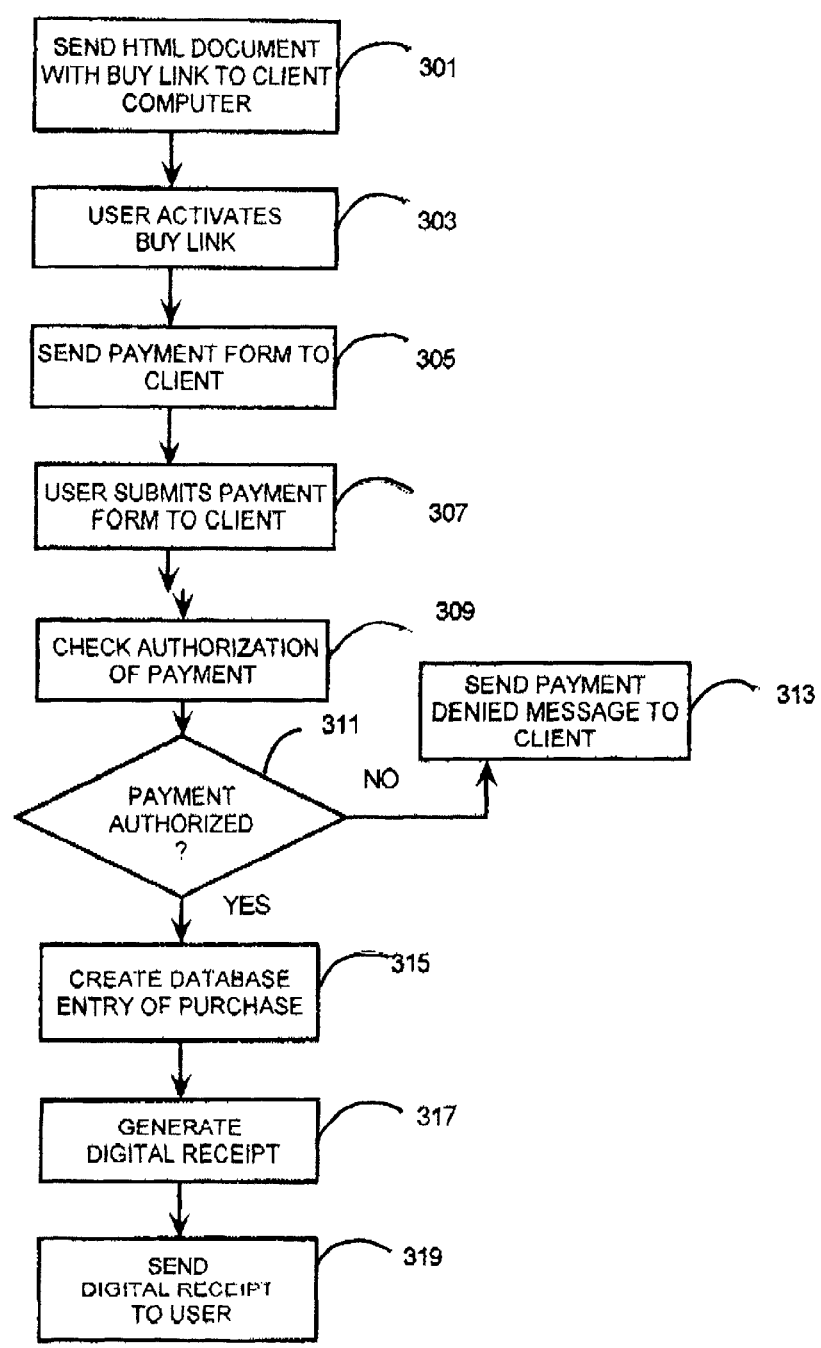
FIG. 3 is a flow diagram showing an initial part of a digital content item purchase transaction according to an embodiment of the invention.

Exemplary Flow Diagram for a Payment Phase of a Digital Content Purchase Transaction Referring to FIG. 3 a flow diagram of the beginning phase of a digital content item purchase transaction is shown. In the first process block, 301, a user using a web browser, running on a client computer connected to the Internet, or alternatively a vending Intranet, is sent a Hyper Text Markup Language (HTML) web page with a buy link. The web page may additionally, or alternatively, contain other language elements, such as, for example, Virtual Reality Markup Language (VRML), Java Applets, and Java Script. In the next process block 303, the user activates a buy link on the web page in order to initiate a purchase transaction for purchasing a digital content item. The activation, may for example, consist on clicking on a hyperlink using a mouse pointer. The buy link points to cash register server. In the next process block 305, in response to the users activation of the buy link, the cash register server sends a payment submission form web page to the client computer, which is interpreted by the web browser to cause the web browser to display a payment submission form. In the next process block, 307 after filling in information in the payment submission form such as name, address, credit card number, and expiration date, the user submits the payment form back to the cash register server. Submission may for example be initiated by the user by clicking on a hypertext link referencing a common gate way interface (CGI) program on the cash register server which processes payment information. In the next process block 309, authorization of the payment is checked. The authorization may entail communication between the cash register server, and credit clearing computer operated by a financial services company. Block 311 is decision block which controls the flow of the process depending on whether the payment is authorized. If payment is not authorized, in block 313 a message indicating that the payment authorization was denied is sent to the user through the web browser. If the payment is authorized, in block 315 a database entry is created for the specific purchase, in a database maintained on an order fulfillment server which is in communication with the cash register server. The database entry may for example include a purchase order number, which serves as the main key of the database, the total value of digital content paid for, the total number of digital content items paid for, and/or and expiration date.

In block 317 a digital receipt is generated. The digital receipt contains information related to the purchase. According to an embodiment of the invention, the digital receipt includes a purchase order number. The digital receipt may include an indication of a class of digital content to which the user is entitled under the terms of the purchase. The digital receipt may also include the web address of the client computer. The latter is used in later verification of the digital receipt, that is, as a means to discourage theft of the digital receipt and its use from a thief's computer, which would have a different web address. The digital receipt may take the form of character string. The character string may for example be generated by concatenating a number of name value pairs containing different items of information. One name value pair could include an indication of the file purchased or an indication of a class of optional files that may be chosen by the buyer according to the terms of the purchase (alternatively this information could be included in the database entry). The format for including multiple name value pairs could for example follow that used in HTTP i.e. each name could be separated from its corresponding value by an equal sign, and the different name-value pairs could be separated from each other, by an ampersand character. For purposes of security, the digital receipt can be encrypted, using a symmetric or asymmetric encryption algorithm. The output produced by the encryption algorithm may be a binary string. The encrypted digital receipt can then be character encoded, for example Base64 encoded in order to create a displayable ASCII character string.

In the next process block 319 the digital receipt is sent to the client computer. The digital receipt may be included within web page code. For example, it may be appended to the URL specified as the value of the HREF attribute of an <A> type HTML tag. The web page would be received and interpreted by the client computer web browser. The URL would point to the order fulfillment server operating according to the design of the instant invention which will be described below. The digital receipt could be included as a formatted text string displayed in the web page.

Instead of sending the digital receipt to the client computer 319, the digital receipt could be stored in a database on the cash register server or on the order fulfillment server. (Parenthetically, one physical computer could serve as both the cash register server and the order fulfillment server.) An interface such as a web based interface could then be provided, through which a remote user could, by entering a credentials e.g. a user name and password, can gain access to (i.e. have sent to the user client) one or more digital receipts that has been previously purchased.

Whether the user is sent the digital receipt in block 319 or accesses it from a database as discussed in the preceding paragraph, the user can be sent the digital receipt in at least the following two forms. In one case, the digital receipt can be appended to an HREF attribute of an <A> type HTML tag which is sent to the user using the HTTP protocol. In the latter case the user would simply click on the hyperlink corresponding to the <A> tag in order to initiated the order fulfillment phase of the digital content item purchase. Alternatively, the digital receipt can be sent as a formatted text string. In the this case the user could copy the digital receipt to a web page form text box, or to a command prompt, depending on the type of interface provided for the order fulfillment system.

Figure 4:
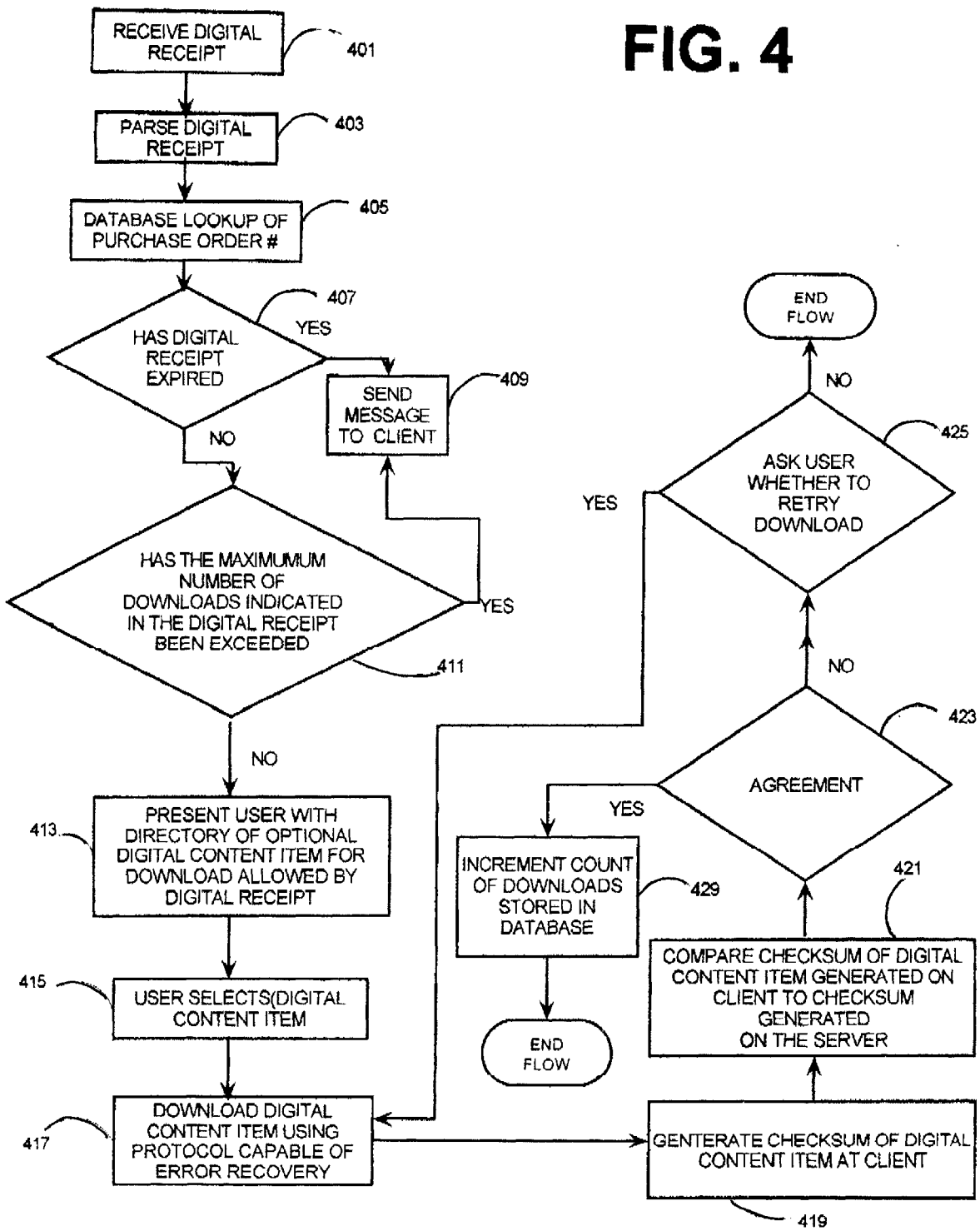
FIG. 4 is a flow diagram showing a subsequent part of a digital content item purchase transaction according to an embodiment of the invention.

Exemplary Flow Diagram for an Order Fulfillment Phase of a Digital Content Purchase Transaction Whereas the flow diagram shown in FIG. 3 generally depicts the payment process, the flow diagram shown in FIG. 4 which will shortly be discussed generally depicts the digital content order fulfillment process. Referring to FIG. 4 in block 401 the digital receipt is received from the client computer at an order fulfillment server. The order fulfillment server may be secure server containing a repository of valuable digital content. The order fulfillment server to be used in connection with a preferred embodiment of the instant invention has certain similarities to an FTP server in that a two-way command connection is established between the client computer and the server computer which allows for unlimited dialog between the client and the server. This is in contrast to the HTTP communication protocol used in the Open Market system discussed in the background section which uses a request and response model and does not provide for further communication e.g. acknowledgment of the response. According to the preferred embodiment of the instant invention the digital receipt is to be sent through an Internet connection established between the client and the server for the purpose of sending commands, and a separate connection is used for sending the digital content.

In block 403, the digital receipt is parsed to extract the various items of information it contains, as mentioned above. If the digital receipt is encrypted and encoded, it will need to be decrypted and decoded in step 403 prior to being parsed. Although not depicted in the flow diagram if the web address of the purchaser had been included in the digital receipt it could be checked against the web address from which the digital receipt was received in step 401, after the digital receipt is parsed in step 403. If the web addresses did not match the digital receipt could be rejected, and the process terminated.

In block 405 the purchase order number which is obtained by parsing the digital receipt in block 403 is used as a key to look up the database entry created in block 315 of FIG. 3. Various items of information used in the order fulfillment process can be included in either the digital receipt as a name value pair, or stored in the database entry.

The purchaser of the digital content item may be given a limited time within which to obtain digital content from the order fulfillment server. One reason for limiting the time, arises from a business model in which purchasers pay for access to an unlimited number of digital content items for a limited time. Another reason for limiting the time, is as a security measure, i.e. to diminish the chances that the digital receipt will be misappropriated and used at a later date after being sold to a third party. In block 407 an expiration date associated with the purchase, which is either parsed from the received digital receipt, or retrieved from the database entry, is compared to the current date to determine if the digital receipt has expired.

If the digital receipt has expired, an error message is sent to the client computer in block 409. If the digital receipt has not expired, in block 411 it is determined whether the maximum number of downloads for the digital receipt has been exceeded. As in the case of the expiration date, the maximum number of downloads can be included either in the digital receipt or in the database entry. A maximum number of downloads may be included according to a business model in which the user pays for a certain number unspecified digital content items from certain defined class. For example, the user may pay predetermined amount in advance to obtain predetermined number movies. At the time of purchase, the user does not need to specify, which classic movies will be obtained. The user can then send the digital receipt to the system on ten different occasions, choose, and obtain a different classic movie. If in block 411 it is determined that the maximum number of downloads has been exceeded, then the user is sent a message to that effect in block 409.

If the maximum number of downloads has not been exceeded, then in block 413, based on information from the database entry, or on information parsed from the digital receipt the user is presented with a listing of selected files and or directories including files, which can be downloaded according to the terms of the purchase. The listing can include text and/or graphical information about the digital content item. The information may be included in a HTML document that is sent to the users web browser.

In block 415, the user selects a specific digital content item, e.g. by clicking on an icon representing the digital content item. In block 417, the digital content item is downloaded using a protocol which has in common with existing FTP protocols the fact that recovery from communication errors is possible without having to start the download again from the beginning. This is facilitated by providing two connections between the order fulfillment server and the client computer. One connection is used by the server to listen for a message from the client indicating a communication error. As used in this specification communication error includes a stoppage of the communication caused by the server, client, or network. In block 419, a checksum of at least a portion of the digital content item used as a designated test portion and preferably of the entire digital content item is calculated at the client. In block 421, a comparison is made between a checksum of the file generated on the order fulfillment server, and the checksum computed in block 419 on the client computer. This important step verifies that digital content item which has been paid for by the use, has been received intact. Either the checksum generated on the client can be sent to the server which will perform the comparison or vice versa. A variety of weak and strong checksum algorithms can be used. A binary sum has the advantage of requiring less computer processing time to compute but is more prone to coincidental validation of a file which actually contains errors. On the other hand a message digest algorithm such as MD5 requires more computer processing time to compute but offers almost complete assurance that the file received is perfectly correct. The choice of what checksum is used depends on the requirements of the particular implementation of the invention, e.g. on the size of the digital content involved, whether the extra time required for computing the more complex check sum is tolerable among other factors. It is noted that the checksum of the received digital content item is made at the application level and is different from checksums that may be used in the transport layer. Low level checksums made at the transport level may be made on a packet by packet basis and are not available for confirmation purposes at the application level. They are not available to be used in updating a database entry of information related to a purchase transaction.

If the checksum computed on the client computer does not match, the flow will proceed through decision block 423 to decision block 425 in which the user is prompted to decide whether or not to retry to downloading the digital content item immediately. If the user decides not to retry immediately, the process is terminated. The user may then save the digital receipt on the client computer, e.g. by saving the HTML web page containing the digital receipt. If the digital receipt was retrieved from a database on the cash register server, then the user need not save the digital receipt since it can be retrieved again from the same database.

If the user does choose to retry the download, the process returns to the digital content item download block 417, and the process proceeds as previously described.

If the outcome of the comparison between the checksum computed at the client computer and the checksum received from the order fulfillment server is a match, the process continues through decision block 423, and in process block 429 a count of digital content items downloaded based on the digital receipt which is stored in the database entry keyed to the purchase order, is incremented. This count is then checked against a maximum number downloads permitted by the terms of the purchase order, as in process block 411, when at some future time the user resubmits the digital receipt in an attempt to obtain a digital content item from the order fulfillment server. In the case that the comparison was performed on the client computer, a message confirming receipt of the digital content item is sent from the client computer to the server computer which then increments the count.

Exemplary Flow Diagram of a Communication Method According to an Embodiment of the Invention.

Figure 5:
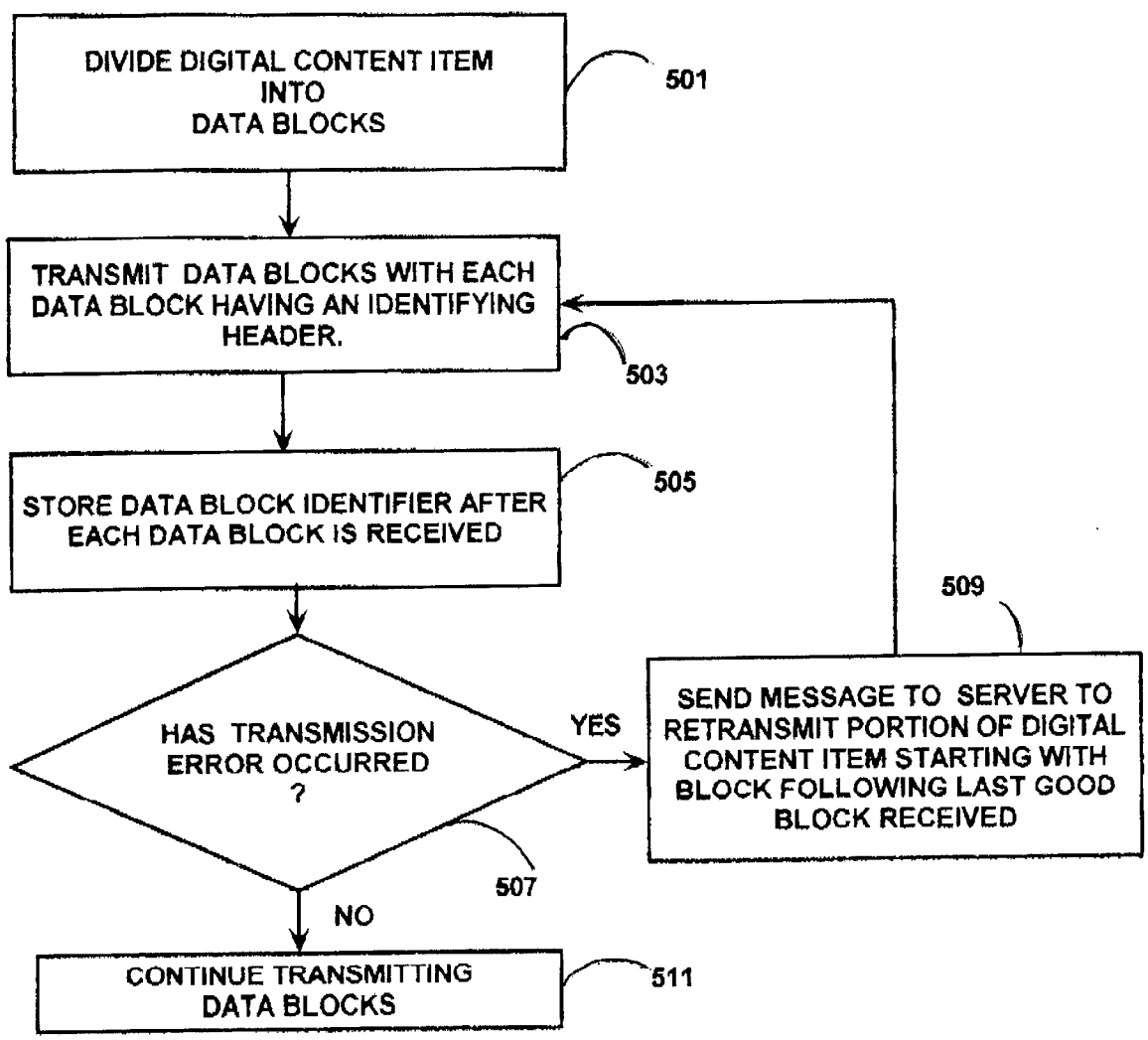
FIG. 5 is a flow diagram of process for communicating a digital content item with error recovery.

Referring to FIG. 5 a method for sending digital content that provides for error recovery without having to retransmit the entire file is shown. In process block 501, a digital content item is divided into a sequence of data blocks. In process block 503, transmission of the data blocks is commenced. Each data block is preceded by a marker. The marker identifies the data block. In process block 505 the marker is stored in the client computer as each data block is received. In process block 507, if a data transmission error is detected, a message containing the marker of the last data block received, and a request for retransmission of the digital content item starting with the next block is sent back to the order fulfillment server. The message may be sent through a control connection between the client and the order fulfillment server, which is distinct from the connection between the two computers through which the digital content item is sent. The order fulfillment server will then begin transmitting the digital content item again starting with the next data block following the one indicated by the received marker. A transmission error could be caused by a network error, or a server error. In process block 511 transmission of the digital content item continues under normal conditions.

What is claimed is:

1. A method for transporting a digital content item between an order fulfillment server and a client computer, the method on the server comprising:

dividing a digital content item into a sequence of successive data blocks;

associating a corresponding unique sequential marker for each of the successive data blocks;

computing a first checksum for each of the successive data blocks at an application level which uses the digital content whether or not a checksum is calculated at a communications transport level;

transmitting each of the sequence of successive data blocks along with the corresponding unique sequential marker to a client computer; and re-transmitting at least one of the sequence of successive data blocks if the client computer computes a second checksum for each of the successive data blocks at an application level of the digital content item and the server computer determines that the first checksum is not equal to the second check sum for at least one of the sequence of successive data blocks.

2. A method according to claim 1, further comprising:

storing the unique sequential marker on the fulfillment server after transmitting each data block to the client system when the first checksum is equal to the second checksum.

3. A method according to claim 2 further comprising:

re-transmitting one or more data blocks in the sequence of sequential data blocks beginning with a data block whose unique sequential marker is greater than the unique sequential marker stored on the fulfillment server.

4. A method according to claim 3 further comprising:

incrementing a counter representing a number of downloads made using a digital receipt after each of the sequence of successive data blocks is transmitted to the client computer and the first checksum and the second checksum for each of the sequence of successive data blocks are equal.

5. The method according to claim 1, further comprising the steps of:

receiving a digital receipt at the order fulfillment server firm a user on a client system via a network;

parsing the digital receipt to extract an indication of a class of digital content items to which the user is allowed access to;

presenting the user on the client system via the network with the list of a plurality of digital content items including a first file within the class of digital content to which the user is allowed access; and accepting a user request for the digital content item via the network prior to the step of computing a first checksum.

6. A computer readable medium comprising programming instruction for transporting a digital content item between an order fulfillment server and a client computer comprising programming instructions for the server comprising:

dividing a digital content item into a sequence of successive data blocks;

associating a corresponding unique sequential marker for each of the successive data blocks:

computing a first checksum for each of the successive data blocks at an application level which uses the digital content whether or not a checksum is calculated at a communications transport level;

transmitting each of the sequence of successive data blocks along with the corresponding unique sequential marker to a client computer; and re-transmitting at least one of the sequence of successive data blocks if the client computer computes a second checksum for each of the successive data blocks at an application level of the digital content item and the server computer determines that the first checksum is not equal to the second check sum for at least one of the sequence of successive data blocks.

7. A computer readable medium according to claim 6, further comprising programming instructions for:

storing the unique sequential marker on the fulfillment server after transmitting each data block to the client system when the fist checksum is equal to the second checksum.

8. A computer readable medium according to claim 7 further comprising programming instructions for:

re-transmitting one or more data blocks in the sequence of sequential data blocks beginning with a data block whose unique sequential marker is greater than the unique sequential marker stored on the fulfillment sever.

9. A computer readable medium according to claim 8 further comprising programming instructions for:

incrementing a counter representing a number of downloads made using a digital receipt after each of the sequence of successive data blocks is transmitted to the client computer and the first checksum and the second checksum for each of the sequence of successive data blocks are equal.

10. The computer readable medium according to claim 6, further comprising the programing instructions of:

receiving a digital receipt at the order fulfillment server from a user on a client system via a network;

parsing the digital receipt to extract an indication of a class of digital content items to which the user is allowed access to;

presenting the user on the client system via the network with the list of a plurality of digital content items including a first file within the class of digital content to which the user is allowed access; and accepting a user request for the digital content item via the network prior to the step of computing a first checksum.

11. A fulfillment system for transporting a digital content item between an order fulfillment server and a client computer, the fulfillment system comprising:

means for dividing a digital content item into a sequence of successive data blocks;

means for associating a corresponding unique sequential marker for each of the successive data blocks;

means for computing a first checksum for each of the successive data blocks at an application level which uses the digital content whether or not a checksum is calculated at a communications transport level;

means for transmitting each of the sequence of successive data blocks along with the corresponding unique sequential marker to a client computer and means for re-transmitting at least one of the sequence of successive data blocks if the client computer computes a second checksum for each of the successive data blocks at an application level of the digital content item and the server computer determines that the first checksum is not equal to the second check sum for at least one of the sequence of successive data blocks.

12. A system according to claim 11, further comprising:

means for storing the unique sequential marker on the fulfillment server after transmitting each data block to the client system when the first checksum is equal to the second checksum.

13. A system according to claim 12, further comprising:

means for re-transmitting one or more data blocks in the sequence of sequential data blocks being with a data block whose unique sequential marker is greater than the unique sequential marker stored on the fulfillment server.

14. A system according to claim 13 further comprising:

means for incrementing a counter representing a number of downloads made using a digital receipt after each of the sequence of successive data blocks is transmitted to the client computer and the first checksum and the second checksum for each of the sequence of successive data blocks are equal.

15. The system according to claim 11, further comprising:

means for receiving a digital receipt at the order fulfillment server from a user on a client system via a network;

means for parsing a first item of information from the digital receipt;

means for using the first item of information as a key into a database to locate a record contained in the database associated with the digit receipt;

means for reading the record to determine a list of digital content items including a first digital content item to which the user is to be given access;

means for presenting the user on the client system via the network with the list of a plurality of digital content items including a first file within the class of digital content to which the user is allowed access; and means for accepting a user request for the first digital content item via the network prior to the means for computing a first checksum.

16. A method for transporting a digital content item between an order fulfillment server and a client computer, the method on the client comprising:

receiving from a fulfillment server a sequence of successive data blocks forming digital content, wherein the digital content item has been;

divided into a sequence of successive data blocks, and each of the successive data blocks has a unique sequential marker associated therewith, and each of the successive data blocks has a first checksum computed and sent therewith, wherein the first checksum is calculated at an application level which uses the digital content whether or not a checksum is calculated at a communications transport level;

receiving, again from the fulfillment server, at least one of the sequence of successive data blocks if the client computer computes a second checksum for each of the successive data blocks at an application level of the digital content item and the server computer determines that the first checksum is not equal to the second check sum for at least one of the sequence of successive data blocks.

17. A computer readable medium for execution on a client comprising the programing instructions of:

receiving from a fulfillment server a sequence of successive data blocks forming digital content, wherein the digital content item has been:

divided into a sequence of successive data blocks, and each of the successive data blocks has a unique sequential marker associated therewith, and each of the successive data blocks has a first checksum computed and sent therewith, wherein the first checksum is calculated at an application level which uses the digital content whether or not a checksum is calculated at a communications transport level;

receiving, again from the fulfillment server, at least one of the sequence of successive data blocks if the client computer computes a second checksum for each of the successive data blocks at an application level of the digital content item and the server computer determines that the first checksum is not equal to the second check sum for at least one of the sequence of successive data blocks.

18. A system for transporting a digital content item between an order fulfillment server and a client computer, the method on the client comprising:

means for receiving from a fulfillment server a sequence of successive data blocks forming digital content, wherein the digital content item has been:

divided into a sequence of successive data blocks, and each of the successive data blocks has a unique sequential marker associated therewith, and each of the successive data blocks has a first checksum computed and sent therewith, wherein the first checksum is calculated at an application level which uses the digital content whether or not a checksum is calculated at a communications transport level;

means for receiving, again from the fulfillment server, at least one of the sequence of successive data blocks if the client computer computes a second checksum for each of the successive data blocks at an application level of the digital content item and the server computer determines that the first checksum is not equal to the second check sum for at least one of the sequence of successive data blocks.

* * * * *